US010737805B2

(12) United States Patent
Sham et al.

(10) Patent No.: US 10,737,805 B2
(45) Date of Patent: Aug. 11, 2020

(54) METHOD AND SYSTEM TO DYNAMICALLY CONFIGURE AND LOAD PLATFORM-SPECIFIC MAINTENANCE SOFTWARE

(71) Applicant: HONEYWELL INTERNATIONAL INC., Morris Plains, NJ (US)

(72) Inventors: Nagaraj Sham, Karnataka (IN); Anil Kumar Pandit, Karnataka (IN); Senthil Rajan Subramanian, Karnataka (IN); Shivkumar Ramachandran, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 131 days.

(21) Appl. No.: 15/860,802

(22) Filed: Jan. 3, 2018

(65) Prior Publication Data
US 2019/0202581 A1    Jul. 4, 2019

(51) Int. Cl.
*B64F 5/60* (2017.01)
*G07C 5/00* (2006.01)
(Continued)

(52) U.S. Cl.
CPC ............... *B64F 5/60* (2017.01); *B64F 5/40* (2017.01); *G06F 11/368* (2013.01);
(Continued)

(58) Field of Classification Search
CPC ........................................................ B64F 5/60
See application file for complete search history.

(56) References Cited

U.S. PATENT DOCUMENTS 8,090,824 B2 *  1/2012  Tran ....................... G07C 5/008
                                                  709/224
8,321,083 B2 * 11/2012  Beebe ................. G06F 11/0739
                                                  701/29.1
(Continued)

FOREIGN PATENT DOCUMENTS

EP          2266880 A1     12/2010

OTHER PUBLICATIONS

Westervelt, "Systems Engineering Approach to Integrated Diagnostics Requirements 11," Mar. 7, 2009 Aerospace Conference, IEEE, Piscataway, New Jersey.
(Continued)

*Primary Examiner* — Bao Long T Nguyen
*Assistant Examiner* — Michael A Berns
(74) *Attorney, Agent, or Firm* — Bookoff McAndrews, PLLC

(57) ABSTRACT

Methods and systems for platform-specific maintenance software configuration are provided. The system providing: a maintenance engine embedded in a flight control system of a platform of a plurality of platforms; and an image building engine at a ground system, configured to process fault data and generate therefrom a binary image file (BIF); and wherein the maintenance engine is configured to: receive and execute the BIF to obtain the fault data pertaining to operation of the platform; establish an authenticated wireless communication link to the image building engine; and transmit the fault data to the image building engine via the authenticated wireless communication link; and the image building engine is configured to: generate the BIF responsive to processing the fault data with maintenance software and a user input; and upload the BIF to a cloud server. The maintenance engine receives the BIF from the cloud via the authenticated wireless communication link.

17 Claims, 2 Drawing Sheets

(51) Int. Cl.
  *H04W 12/06* (2009.01)
  *G06F 11/36* (2006.01)
  *B64F 5/40* (2017.01)
  *G06F 11/14* (2006.01)
  *G06F 9/445* (2018.01)

(52) U.S. Cl.
  CPC ...... *G06F 11/3664* (2013.01); *G06F 11/3672* (2013.01); *G06F 11/3684* (2013.01); *G06F 11/3692* (2013.01); *G07C 5/006* (2013.01); *G07C 5/008* (2013.01); *H04W 12/06* (2013.01); *G06F 9/44505* (2013.01); *G06F 11/1433* (2013.01)

(56) References Cited

U.S. PATENT DOCUMENTS

| | | | |
|---|---|---|---|
| 8,335,601 B2 | 12/2012 | Sham et al. | |
| 8,509,963 B1 | 8/2013 | Barnes et al. | |
| 8,560,160 B2 | 10/2013 | Holzer | |
| 9,471,407 B2 * | 10/2016 | Laval | G05B 23/0272 |
| 9,475,590 B2 * | 10/2016 | Buehler | G07C 5/0808 |
| 9,550,583 B2 * | 1/2017 | Szeto | G07C 5/008 |
| 9,969,508 B2 * | 5/2018 | Szeto | G07C 5/008 |
| 10,025,609 B2 * | 7/2018 | Rong | G06F 9/45558 |
| 10,248,545 B2 * | 4/2019 | Dominguez | G06F 8/447 |
| 2013/0304420 A1 | 11/2013 | Laval et al. | |
| 2016/0083118 A1 * | 3/2016 | Mahalingaiah | G07C 5/0841 701/32.1 |
| 2016/0207639 A1 * | 7/2016 | Ellis | G06Q 10/0635 |
| 2016/0257429 A1 | 9/2016 | Szeto | |
| 2018/0026799 A1 * | 1/2018 | Pottier | H04L 9/3265 713/156 |

OTHER PUBLICATIONS

Ismail et al., "A potential study of prognostic-based maintenance for primary flight control electro-mechanical actuators," Mar. 16, 2016, Recent Advances in Aerospace Actuation Systems and Components, Toulouse, France.

Boeing; Airport Wireless System Planning to Support Boeing Aircraft, 2017.

* cited by examiner

METHOD AND SYSTEM TO DYNAMICALLY CONFIGURE AND LOAD PLATFORM-SPECIFIC MAINTENANCE SOFTWARE

TECHNICAL FIELD

The present invention generally relates to mobile platform-specific maintenance systems, and more particularly relates to methods and systems for dynamically configuring and loading aircraft-specific maintenance software.

BACKGROUND

Aircraft maintenance checks are periodic inspections that have to be done on all types of aircraft at frequent intervals as per the norms of the certification authorities like the federal aviation administration (FAA), joint aviation authorities (JAA), etc. These maintenance checks are periodic inspections generally include related maintenance software. The maintenance software is employed to exercise aircraft surfaces, systems, and components, to thereby identify/detect and address potential failures as early as possible.

In many aircraft, the flight control system (FCS) is very complex and forms a significant portion of the aircraft's software. The maintenance software generally resides within the FCS. Having the maintenance software in the FCS has several undesirable effects. First, it increases the size and complexity of the FCS software by many folds, which directly impacts FCS system performance and throughput. Next, as maintenance software is a major portion of the FCS software, the majority of the time delay in any new FCS software release may be related to the maintenance software. Related thereto, any minor change in the maintenance software requires re-certification of the FCS software, increasing the overall cost of the system.

Accordingly, improvements in aircraft maintenance software configuration that lean out the FCS software, improve efficiency, and reduce overall costs for the suppliers, original equipment manufacturers (OEM), and certification efforts, are desirable. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A platform-specific maintenance software configuration system is provided. The system comprising: a maintenance engine embedded in a flight control system of a platform of a plurality of platforms; and an image building engine at a ground system, the image building system configured to process fault data and generate therefrom a binary image file (BIF) for a specific initiated maintenance test or System test; and wherein the maintenance engine is configured to: establish an authenticated wireless communication link to the image building engine; and receive and execute the BIF to thereby obtain the fault data pertaining to operation of the platform; transmit the fault data to the image building engine via the authenticated wireless communication link; and the image building engine is configured to: generate the BIF responsive to processing the fault data with maintenance software and a user input requesting the specific initiated maintenance test or System test; and transmit the BIF via the authenticated wireless communication link.

A method for platform-specific maintenance software configuration for a platform of a plurality of platforms is provided. The method comprising: at the platform, obtaining fault data pertaining to operation of the platform; establishing an authenticated wireless communication link to a ground system configured to process fault data and generate therefrom customized executable test files for a specific initiated maintenance test or System test; and transmitting the fault data to the ground system, via the authenticated wireless communication link; at the ground system; processing the fault data to generate a customized executable test file that is a binary image file (BIF) for the specific initiated maintenance test or System test; and transmitting the BIF to the platform, via the authenticated wireless communication link.

Also provided is a maintenance software configuration system, the system comprising: a maintenance engine embedded in a flight control system of a platform of a plurality of platforms; an image building engine at a ground system located remotely from the platform, configured to process fault data from the platform and to generate a binary image file (BIF) therefrom; a maintenance software database coupled to the image building engine at the ground system; and a server referred to as a cloud, the cloud located remotely from the platform; and wherein the maintenance engine is configured to: receive the BIF from the cloud; execute the BIF to obtain the fault data pertaining to operation of the platform; establish an authenticated wireless communication link to the image building engine; and transmit the fault data to the image building engine via the authenticated wireless communication link; and the image building engine is configured to: generate the BIF which comprises a specific initiated maintenance test or System test responsive to processing the fault data with maintenance software and a user input requesting the specific initiated maintenance test or System test; and upload the BIF to the cloud via the authenticated wireless communication link.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

Figure 1:
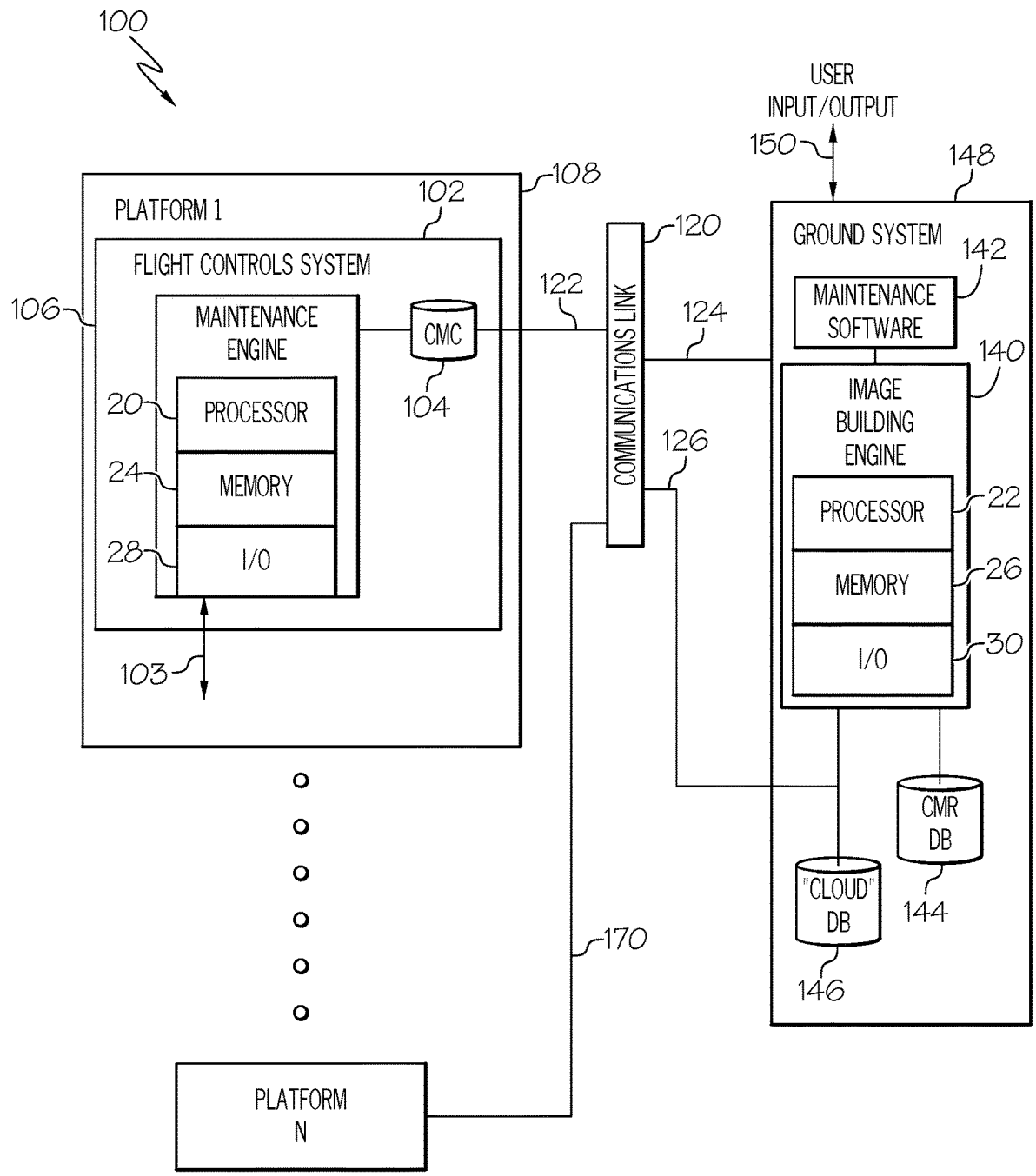
FIG. 1 is a block diagram of a system, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method reference a maintenance engine (FIG. 1, 102) interacting with an image building engine (FIG. 1, 140), each of these are processing engines that may be implemented as a control module. In an embodiment, the maintenance engine may comprise a processor 20, memory 24, and I/O block 28. In an embodiment, the image building engine may comprise a processor 22, memory 26, and I/O block 30. The maintenance engine 102 may be separate from, or integrated within, a preexisting mobile platform management system, avionics system, flight controls system (FCS) (FIG. 1, 108) or aircraft flight management system (FMS). The image building engine 140 may be separate from, or integrated within, a preexisting ground system (FIG. 1, 148).

Exemplary embodiments of the disclosed system 100 provide a technologically improved method and system to dynamically configure maintenance software (FIG. 1, 142) and load the configured maintenance software, using a "cloud" (FIG. 1, 146). It is understood that the cloud 146 is a server or database configured for data storage and retrieval. The cloud 146 may reside within or proximate to the ground system 148, as depicted in FIG. 1, or it may be located at a third location that is different from a location of the platform 108 and different from a location of the ground system 148.

Turning now to FIG. 1, a platform 108 and the ground system 148 are shown configured as a maintenance software configuration system 100, in accordance with an embodiment. The maintenance engine 102 is embedded in a flight controls system (FCS) 106 of the platform 108, and it communicates via a communications link 120 with the image building engine 140. The image building engine 140 is located at the ground system 148. The platform 108 may be a first platform of N platforms, each having therein a respective maintenance engine 102. Link 122 represents a connection from the maintenance engine 102 to the communications link 120, and link 124 represents a connection from the image building engine 140 to the communications link 120. The cloud 146 is a server/storage database. The cloud 146 has a connection 126 to the communications link 120. In the depicted example, the platform 108 is an aircraft, the ground system 148 is at a ground system of some sort, and the configuration of system 100 is directed to configuring aircraft-specific maintenance software. These functional blocks are described in more detail below.

User input/output 150 may be provided by a remote device such as a cell phone, laptop, or tablet computer. A user, such as a maintenance operator, may provide user input 150 to select or initiate running the maintenance software, or one or more subtests within it (these subtests are specific maintenance tests or System tests, so the user requested subtests are referred to herein as initiated tests, which is described in more detail below). Information flowing from the ground system 148 to a user via the user input/output 150 includes results of the initiated tests (also described in more detail below).

The Certification Maintenance Requirements (CMR) 144 is server/database communicatively coupled to the image building engine 140. CMR data is related to the maintenance software 142, and contains, (i) a duration of each initiated test (IT), and (ii) a time to trigger the initiated test as identified in Certification Maintenance Requirements (CMR). Retrieving the certificate maintenance requirements may include referencing a fleet profile in a database in memory 26 at the ground system 148.

The wireless communications link 120 may comprise one or more wireless communication networks, such as a terminal wireless local area network (LAN) unit (TWLU).

The maintenance engine 102 detects latent and active faults pertaining to the operation of the platform 108. Detecting faults generally includes (i) executing a set of maintenance commands that may trigger specific actuators and sensors, and (ii) obtaining respective responses thereto. The bidirectional signal 103 represents the flow of the maintenance commands and the return of the related responses, which are referred to as "fault data." Specifically, embodiments of the maintenance engine 102 execute maintenance commands from a customized binary image file (BIF) that is generated by the image building engine 140. The fault data obtained by executing the customized binary image file may comprise, for example, flight leg faults, and is uniquely related to the platform 108 on which it was obtained. The nature of the customized BIF, and of the fault data generated therefrom, is described in more detail below.

As mentioned, aircraft maintenance checks are required to be performed at periodic intervals, in accordance with the norms of the certification authorities, such as the FAA and JAA. The maintenance software 142 is directed to meeting this requirement. The maintenance software 142 is the maintenance test instructions for all the available tests and subtests under each aircraft type configuration (recall, "initiated tests" are for specific maintenance tests or System tests, and are understood to be related to the host platform 108). The maintenance software 142 is designed to detect potential failures as early as possible in order to enable addressing potential failures before they become actual failures. New releases of the maintenance software 142 are provided only after they have been through certification procedures. A technological benefit of the provided maintenance software configuration systems and methods is the dis-integration of the maintenance software 142 with the flight controls system 106. Specifically, having the maintenance software 142 reside external to the platform 108 means that (i) certification of the maintenance software 142 does not require recertification of the software in the flight controls system 106, and initiated tests can be uploaded to the aircraft on an as-needed basis.

The image building engine 140 of the present disclosure utilizes the maintenance software 142, and processes it with user input 150, CMR data, and formatted fault data obtained from a platform 108 (for example platform 1). The image building engine 140 processes the inputs to generate therefrom a platform-specific (i.e., an aircraft-specific) maintenance BIF. In various embodiments, the image building engine 140 stores the BIF in the cloud 146 (FIG. 2, 210).

Figure 2:
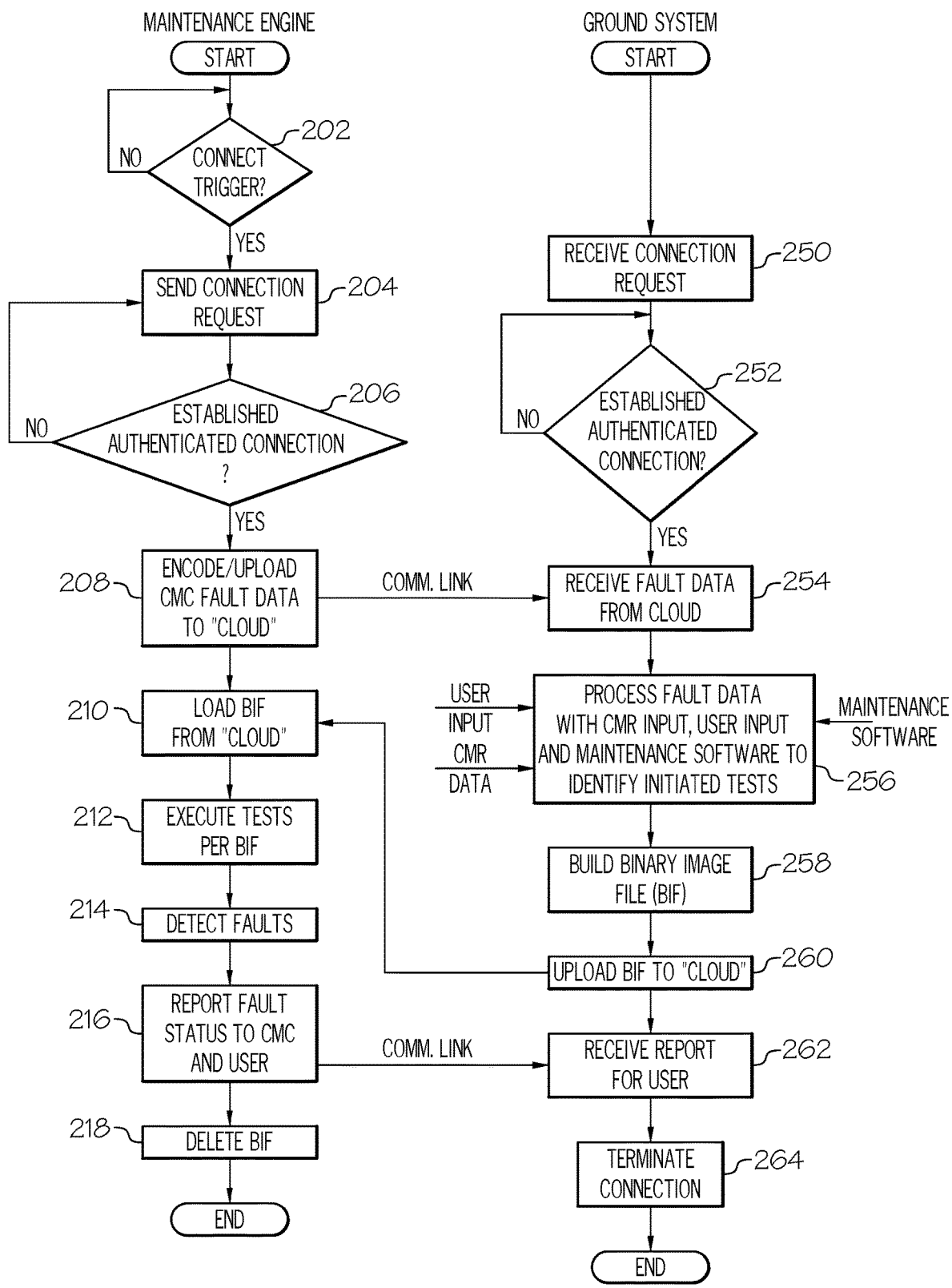
FIG. 2 is a flow chart for a method maintenance software configuration, in accordance with an exemplary embodiment.

As mentioned, the maintenance software configuration system 100 may be used to implement a method 200, as shown in the flow chart of FIG. 2. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

Before the method 200 starts, it is understood that the maintenance software configuration system 100 is initialized. Initialization generally comprises uploading or updating instructions and applications as required for operation of the maintenance engine 102 and as required for operation of the image building engine 140. This may include: authentication protocols used in connection with the communications link 120; the maintenance software 142; the values stored in the CMR 144; and, any associated stored variables.

At 202, the maintenance engine 102 awaits a "connect trigger," which may be a predetermined event. In an embodiment, the predetermined connect trigger is the confirmation that the wheels of the platform 108 are on the ground, sometimes referred to as "weight on wheels."

Once a connect trigger occurs, the maintenance engine 102 initiates a connection request at 204. The connection request is a request for an authenticated connection through communications link 120 to the ground system 148. Authentication may comprise executing a handshake protocol, or any other pre-arranged industry standard authentication protocol.

After establishing that an authenticated connection (206) has been acquired, at 208, the maintenance engine 102 transmits a file (the formatted and encoded fault data described herein) from storage in a central maintenance computer (CMC) 104 to the cloud 146, via the communications link 120. How and when the formatted fault data is loaded into the cloud 146 is described below.

At 210, the maintenance engine 102 receives a binary image file (BIF) that was generated by the image building engine 140 (at 258, described below). Receipt of the BIF may involve a delay related to processing and uploading/downloading, and receipt of the BIF may represent completion of one or more file transfers. For example, an application hosted in the cloud 146 may uplink the BIF to the aircraft (platform 108), wherein it is loaded in the FCS 106. In another example, the image building engine 140 uploads a completed BIF to the cloud 146 (at 260, described below), and the maintenance engine 102 retrieves the BIF from the cloud 146, via the communications link 120. The BIF comprises encoded instructions for one or more subtests; each subtest is directed to detecting faults at a specific subsystem, surface, component, line replacement unit (LRU), or the like, of the platform 108, to which it is sent. In other words, the BIF is customized (i.e., it is configured maintenance software) specifically for the receiving platform 108, as such, it is enhanced maintenance software used by the flight controls system 106.

At 212, a trigger (for example, from a maintenance person) occurs. The trigger is a request to initiate one or more subtests within the BIF, i.e., the "initiated test(s)". In one example, the BIF comprises a periodically performed maintenance test based on elapsed flight-hours. In another example, the BIF comprises a periodically performed maintenance test based on usage of a line replacement unit (LRU). In still another example, the BIF comprises certificate maintenance requirements.

Responsive to the trigger, the maintenance engine 102 executes the BIF initiated tests and obtains the respective fault data. The step of executing the initiated tests utilizes the bidirectional signal 103 into the platform 108. The step of executing the initiated tests includes (i) uploading and decoding the respective initiated test instructions from the BIF, and (ii) generating therefrom commands (at 103) that direct the performance of the one or more initiated tests in the platform 108. At 214, responsive to executing the initiated tests, respective fault data is obtained (at 103). Fault data comprises one or more detected faults, and detected faults comprise in flight faults and on-ground faults.

At 216, the obtained fault data (i.e., test results from the initiated tests) may be formatted and encoded, generating "formatted" fault data, and the formatted fault data may be transmitted back to the ground system 148 and (a) provided at the user input/output 150, for review by a maintenance operator. Also at 216, the formatted fault data may be stored in a storage location onboard the platform 108, such as the CMC database 104, and retrieved by a user at a later time.

It is to be understood that, subsequent to (a), the maintenance operator may wish to initiate additional subtests (again, for one or more specific maintenance tests or System tests). In doing so, steps 256-262 would repeat at the ground system 148, and steps 210-218 would repeat at the platform 108. For example, the method 200 may include receiving additional (initiated) tests from the maintenance operator subsequent to (a); executing the additional (initiated) tests; and storing the additional (initiated) tests and their results in the cloud 146. Once the maintenance engine 102 has completed the execution of a BIF, it deletes the BIF at 218. By deleting the BIF, the demands on local storage, such as memory 24, in the platform 108 remain a minimum.

As mentioned, the maintenance software configuration system 100 comprises the cooperation of the above described maintenance engine 102 and the image building engine 140. We turn now to the method steps performed by the image building engine 140 located at the ground system 148. At 250, the ground system 148 receives a connection request from the platform 108, and begins the predetermined authentication protocol over the communications link 120. At 252, when the authenticated connection is established, the ground system 148 receives the formatted fault data that was uploaded from the CMC database 104 (at 208). As mentioned, a maintenance person may request that one or more of the many possible aircraft-specific subtests originally found in the maintenance software 142 be performed (i.e., initiated), the request is received as user input 150 (via a remote device such as iPhone/iPad, etc.). The image building engine 140 processes the user input 150, maintenance software 142, and the formatted fault data to identify initiated tests to include in the BIF. In various embodiments, identifying initiated tests to include in the BIF further comprises processing CMR data.

At 258, the BIF is generated or built; as mentioned herein, the BIF is a customized executable file that contains respective initiated tests for one or more platform 108 specific maintenance tests or System tests. At 260, the BIF may be uploaded to the cloud 146 (from which the BIF may be retrieved by the maintenance engine 102, at 210). At 262, the formatted initiated test results are received for the user to review. These are made available via the user input/output 150. At 264, the connection is terminated.

Accordingly, the exemplary embodiments discussed above provide a technologically improved method and system to dynamically configure and load maintenance software, using a cloud 146.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A platform-specific maintenance software configuration system for a plurality of platforms, the system comprising:
   an image building engine comprising a processor and a memory, having maintenance software, and located at a ground system, the image building engine configured to
   receive a user-selected initiated test, defined as a specific maintenance test or System test for a platform of the plurality of platforms,
   process the initiated test with certification maintenance requirements (CMR) data for the initiated test, and
   generate a binary image file (BIF) that is customized, comprising encoded instructions for the initiated test and the platform; and
   a maintenance engine comprising a processor and a memory, embedded in a flight control system of the platform;
   the maintenance engine is configured to:
      establish an authenticated wireless communication link to the image building engine;
      receive and execute the BIF to thereby obtain fault data pertaining to the initiated test during operation of the platform; and
      transmit the fault data to the image building engine via the authenticated wireless communication link; and
      delete the BIF from the maintenance engine after executing the BIF;
   the image building engine is further configured to:
      receive the fault data;
      provide the fault data at a user input/output for review by maintenance operator;
      generate the BIF responsive to processing the received fault data; and
      transmit the BIF via the authenticated wireless communication link.

2. The system of claim 1, further comprising a server referred to as a cloud, the cloud located remotely from the platform, and wherein the image building engine is further configured to store the BIF in the cloud.

3. The system of claim 2, wherein the maintenance engine is further configured to receive the BIF from the cloud via the authenticated wireless communication link.

4. The system of claim 3, further comprising a central maintenance computer (CMC) at the platform, and wherein:
   the maintenance engine is further configured to encode and store the fault data in the CMC; and
   transmit the fault data stored in the CMC to the image building engine via the authenticated wireless communication link.

5. The system of claim 4, wherein the fault data comprises one or more detected faults, and detected faults comprise in flight faults and on-ground faults.

6. The system of claim 5, wherein the BIF comprises a periodically performed maintenance test based on elapsed flight hours.

7. The system of claim 6, wherein the BIF further comprises a periodically performed maintenance test based on usage of a line replacement unit (LRU).

8. The system of claim 5, wherein:
   the maintenance engine is further configured to transmit to the image building engine, a connection request; and
   the image building engine is further configured to accept the connection request from the maintenance engine, responsive to performing an authentication procedure.

9. The system of claim 5, further comprising a certificate maintenance requirements database, and wherein the BIF includes certificate maintenance requirements from the certificate maintenance requirements database for the initiated test.

10. The system of claim 9, wherein the image building engine is further configured to retrieve the certificate maintenance requirements based on referencing a fleet profile for the platform.

11. A processor-implemented method for platform-specific maintenance software configuration for a platform of a plurality of platforms, the method comprising:
    at the platform,
       establishing an authenticated wireless communication link to an image building engine in a ground system;
       receiving a first customized binary image file (BIF), the first customized BIF having coded instructions to perform a first specific maintenance test or System test on the platform;
       executing the first customized BIF during operation of the platform to obtain fault data pertaining to the first specific maintenance test or System test;
       transmitting the fault data to the image building engine via the authenticated wireless communication link; and
       deleting the first customized BIF upon completion of the execution of the first customized BIF;
    at the ground system, in the image building engine including maintenance software;
       receiving the fault data;
       receiving a user-selected initiated test, defined as a specific maintenance test or System test for the platform;
       processing the fault data, user-selected initiated test, and certification maintenance requirements (CMR) data for the initiated test, to generate therefrom a second customized BIF; and
       transmitting the second customized BIF to the platform, via the authenticated wireless communication link.

12. The method of claim 11, further comprising, storing the second customized BIF in a cloud located remotely from the platform.

13. The method of claim 12, wherein the fault data comprises one or more detected faults, and detected faults comprise in flight faults and on-ground faults.

14. The method of claim 13, wherein the first customized BIF comprises, selectively, a combination of: a periodically performed maintenance test based on elapsed flight hours; a periodically performed maintenance test based on usage of a line replacement unit (LRU); and, certificate maintenance requirements.

15. The method of claim 14, further comprising retrieving the certificate maintenance requirements data based on referencing a fleet profile in a memory at the ground system.

16. The method of claim 15, further comprising:
   (a) at the ground system, providing the fault data at a user input/output, for review by a maintenance operator.

17. The method of claim 16, further comprising:
   receiving additional initiated tests from the maintenance operator subsequent to (a);
   executing the additional initiated tests;
   storing the additional initiated tests and their results in the cloud; and
   providing formatted initiated test results at the user input/output, for review by the maintenance operator.

\* \* \* \* \*